US006363374B1

(12) United States Patent
Corston-Oliver et al.

(10) Patent No.: US 6,363,374 B1
(45) Date of Patent: Mar. 26, 2002

(54) TEXT PROXIMITY FILTERING IN SEARCH SYSTEMS USING SAME SENTENCE RESTRICTIONS

(75) Inventors: Simon H. Corston-Oliver, Seattle; Lucretia H. Vanderwende, Bellevue; William B. Dolan, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/224,150

(22) Filed: Dec. 31, 1998

(51) Int. Cl.[7] .............................................. G06F 17/30
(52) U.S. Cl. ................. 707/3; 707/5; 709/203
(58) Field of Search ...................... 707/2, 3.5; 709/203; 704/1.9, 231, 255; 326/41, 44

(56) References Cited

U.S. PATENT DOCUMENTS

| | | | | |
|---|---|---|---|---|
| 5,845,278 A | * | 12/1998 | Kirsch et al. .................. | 707/3 |
| 5,859,972 A | * | 1/1999 | Subramaniam et al. ...... | 709/203 |
| 5,873,081 A | * | 2/1999 | Harel ............................. | 707/3 |
| 5,920,854 A | * | 7/1999 | Kirsch et al. .................. | 707/3 |
| RE36,727 E | * | 1/2000 | Kageneck et al. ............. | 707/3 |
| 6,018,733 A | * | 1/2000 | Kirsch et al. .................. | 707/3 |

* cited by examiner

Primary Examiner—Thomas Black
Assistant Examiner—Susan Chen
(74) Attorney, Agent, or Firm—Theodore M. Magee; Westman, Champlin & Kelly, P.A.

(57) ABSTRACT

A method of computerized searching receives parameters of a search query from a user and adds a restriction to the parameters to require that at least two of the search terms of the search query appear in a same sentence in a document. A representation of a set of documents is then searched based on the parameters of the search query and the added restriction. Documents that meet the search parameters and the added restriction are thus identified.

24 Claims, 7 Drawing Sheets

TEXT PROXIMITY FILTERING IN SEARCH SYSTEMS USING SAME SENTENCE RESTRICTIONS

BACKGROUND OF THE INVENTION

The present invention relates to computerized text searching. In particular, the present invention relates to refining search results.

One of the most popular uses for computer systems is the storage and retrieval of large amounts of data. To retrieve data, especially text-based data, users either search through an index of the data to locate the data they desire or submit a search query to a computerized search tool that searches through the data based on the parameters of the query.

Typically, search queries take one of three forms. In one form, the user supplies stand-alone terms without using connecting terms to show the relationship between the stand-alone terms. In a second form, the user connects the terms in the query using logical operators such as the Boolean operators AND, OR, and NOT, or pseudo-Boolean proximity operators such as NEAR, and W/x (within x words). In a third form, the user simply types their search goal in natural language.

In all of these forms, it is often difficult for users to precisely state their search goals. As a result, users' queries often generate results with poor precision by returning many documents that are irrelevant to the users' search. This is especially true of searches of the Internet.

One cause of poor precision is that users fail to indicate that the terms of the search query should appear in the same sentence. Although such a limitation is implicit in many search queries, users do not know how to construct their query to implement such a limitation. One major cause of this problem is search tools that do not support same-sentence logical operators. However, even when using search tools that support same-sentence logical operators, users often fail to include the same-sentence restriction in their search.

SUMMARY OF THE INVENTION

A method of computerized searching receives parameters of a search query from a user and adds a restriction to the parameters to require that at least two of the search terms of the search query appear in a same sentence in a document. A representation of a set of documents is then searched based on the parameters of the search query and the added restriction. Documents that meet the search parameters and the added restriction are thus identified.

In another embodiment of the invention, a computerized search tool searches a representation of a set of documents based on the parameters of a user's search query. Based on this search, documents that meet the parameters of the search query are identified with preference given to those documents that have at least two terms from the search query in a same sentence.

DETAILED DESCRIPTION OF ILLUSTRATIVE EMBODIMENTS

Figure 1:
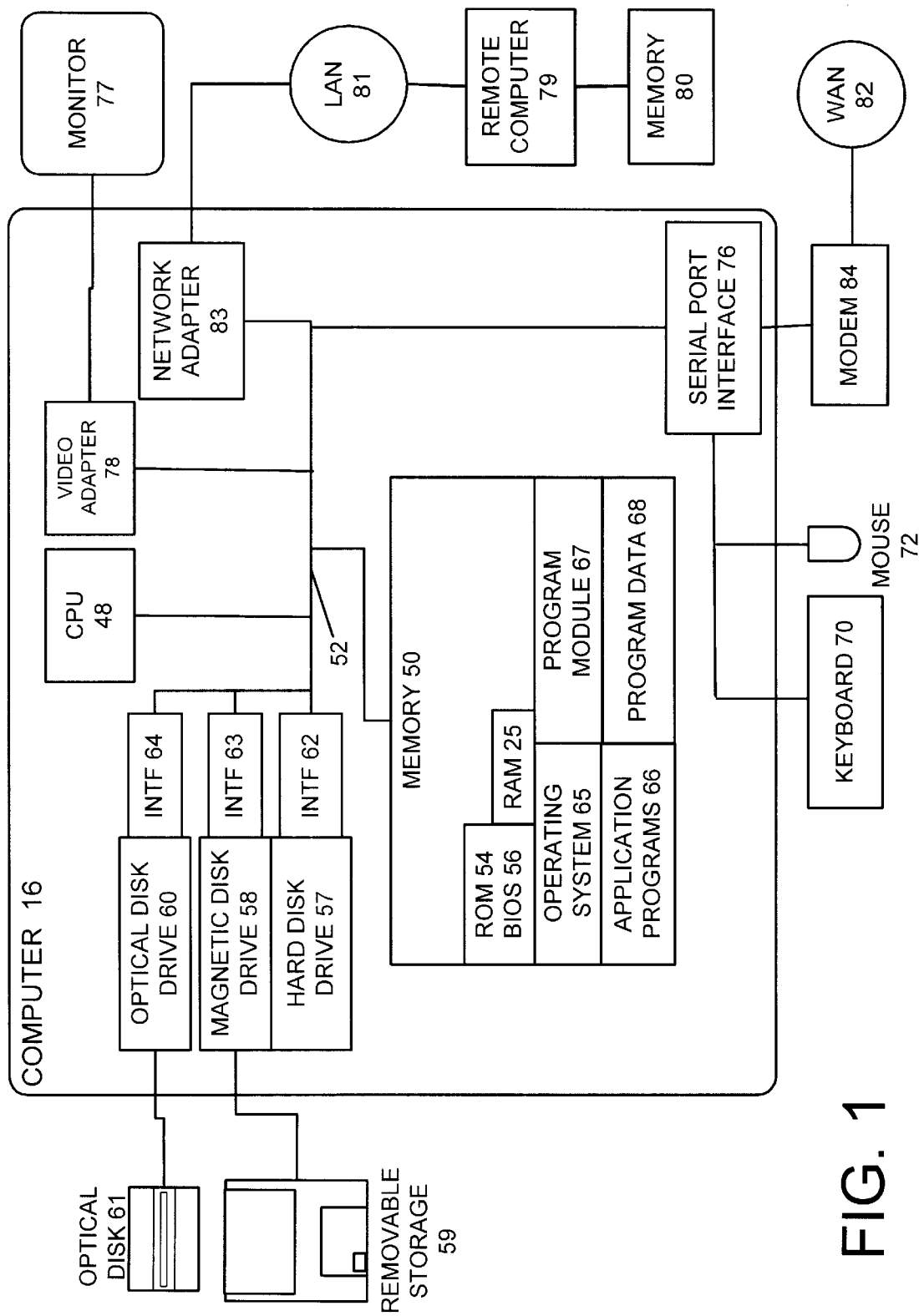
FIG. 1 is a plan view of an exemplary environment for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
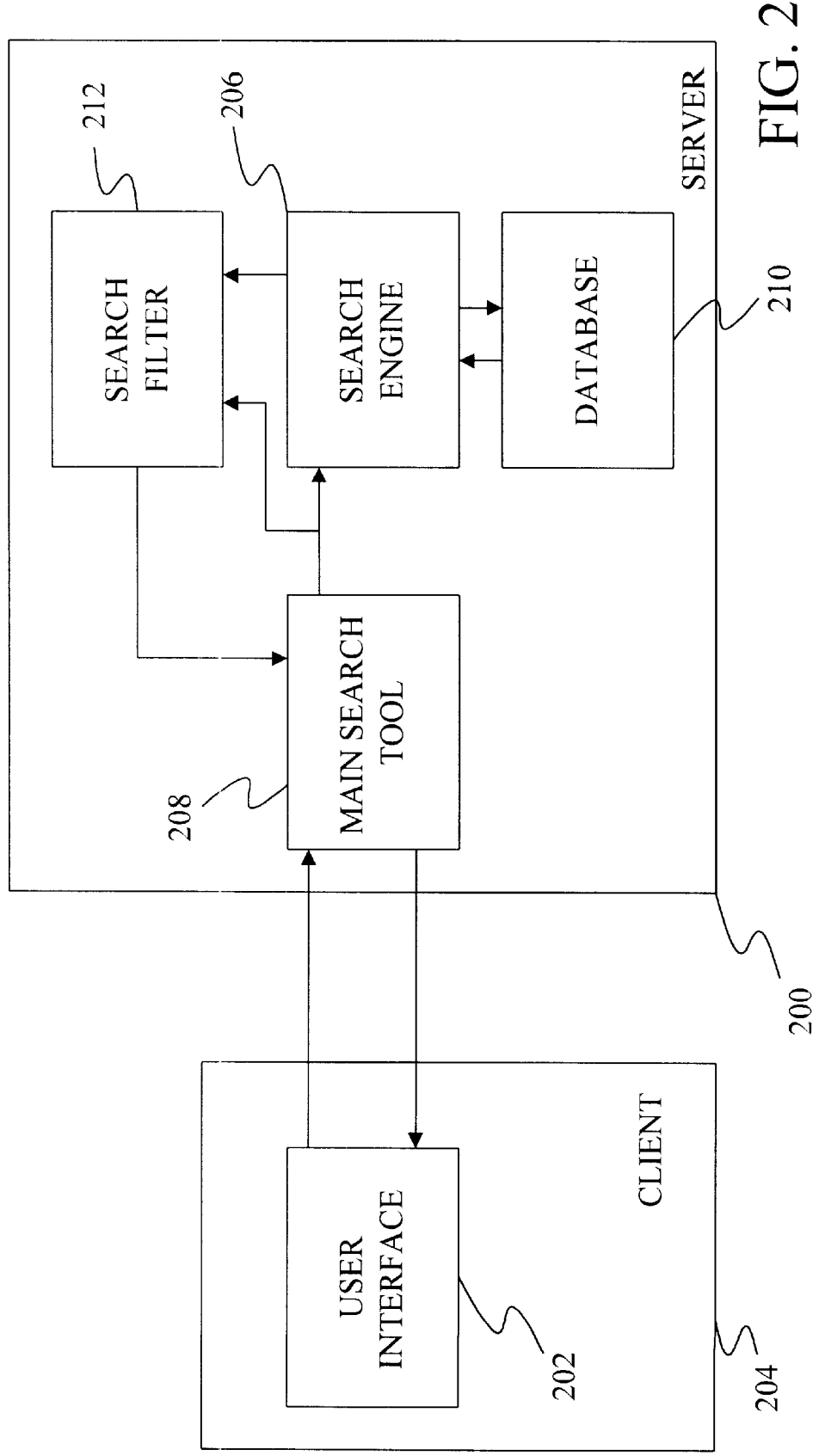
FIG. 2 is a block diagram of one embodiment of the present invention.
Figure 3:
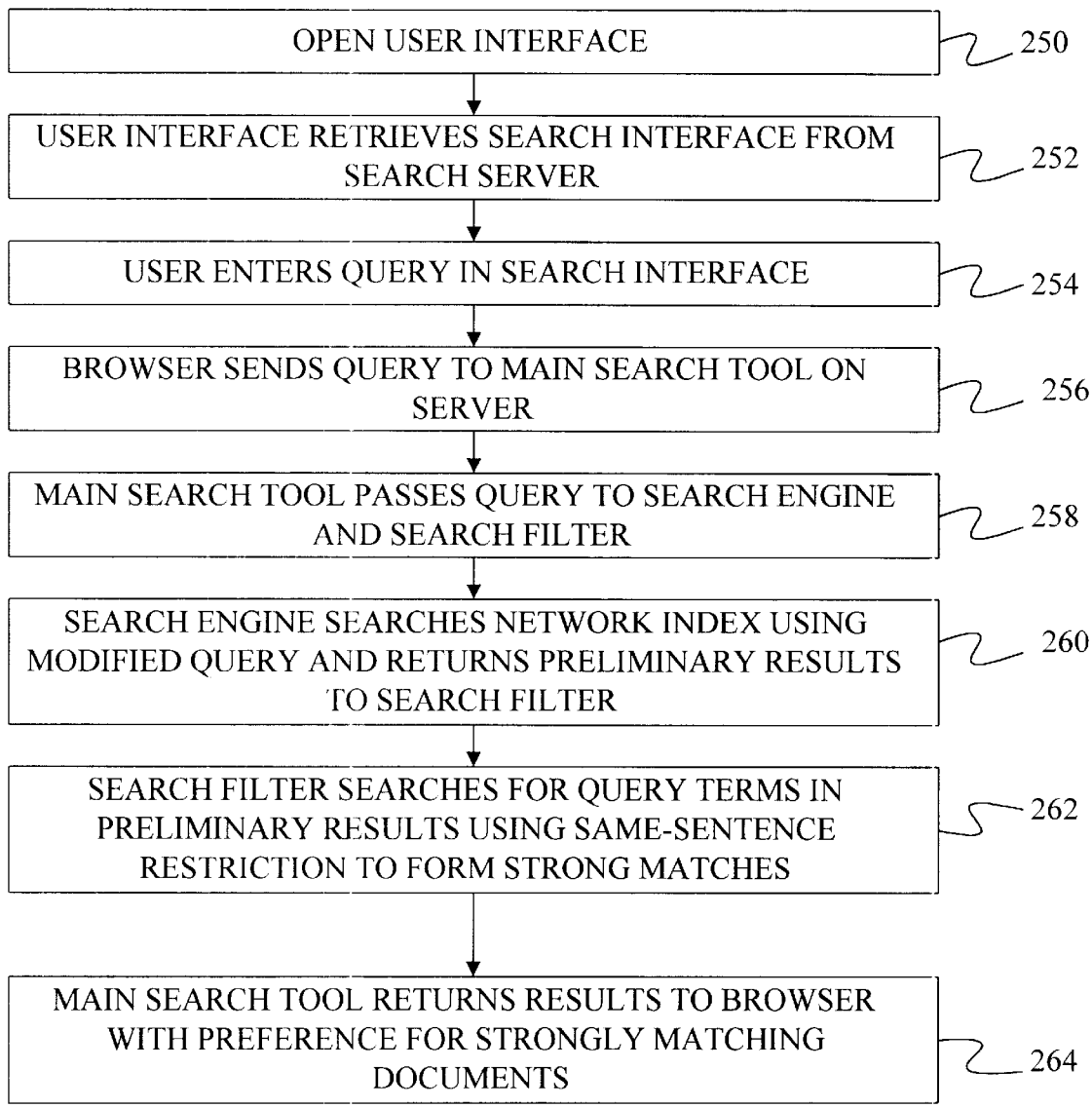
FIG. 3 is a flow diagram of a method of the present invention associated with FIG. 2.

FIG. 2 is a block diagram of an embodiment of the present invention, which has its operation described in a flow diagram found in FIG. 3. Under this embodiment of the invention, a user's search query is improved by adding a same-sentence restriction to the query such that documents that have two query terms in a single sentence are given preference over documents that simply have the two query terms somewhere in the document.

The process of FIG. 3 begins at step 250 where a user interface 202 is opened on a client 204 of FIG. 2. Client 204 can include a computer such as the one described in FIG. 1. User interface 202 can include any of a number of browsers available in the market including Internet Explorer IE4, by Microsoft Corporation of Redmond, Washington.

At step 252, user interface 202 retrieves a search interface from a remote server 200 using known network protocols. The search interface is displayed by user interface 202 and includes text and graphics designed to elicit a search query from the user.

At step 254 of FIG. 3, the user enters a search query in an appropriate text box of the search interface. Based on instructions found in the search interface, user interface 202 sends the search query to a main search tool 208 on remote server 200.

At step 258, main search tool 208 passes the search query to search engine 206 and to a search filter 212. Search engine 206 uses the search query to search a database 210 at step 260.

Search engine 206 can be a free text/natural language search engine that uses linguistic clues in the search query to identify terms and phrases that should appear together in any matching documents. Alternatively, search engine 206 can be a statistical search engine that returns matches for the search query based on the statistical significance of the terms in the query appearing in a document on the network. In further alternate embodiments, search engine 206 is a simple matching search engine that returns all pages that have terms that match the search terms.

Based on the search of database 210 at step 260, search engine 206 sends preliminary results of the search to a search filter 212. The preliminary or first pass results identify those documents that meet the limitations and parameters of the user's search query. At step 262, search filter 212 searches through the preliminary results using a same-sentence restriction. The same-sentence restriction requires that at least two terms of the search query appear within a single sentence of a document. The specific process for implementing the same-sentence restriction is described further below.

For each document that satisfies the same-sentence restriction, an indication of a strong match is passed from filter 212 to main search tool 208. At step 264, main search tool 208 returns results of the search to user interface 202 giving preference to any strong matches found by search filter 212. This preference can amount to organizing the search results so that strong matches appear first on user interface 202 and other matches found in the preliminary results appear later. Alternatively, the preference can be realized by returning only the strong matches to user interface 202 and ignoring the remaining matches from the preliminary results.

Although search filter 212 of FIG. 2 has been described as a separate component from search engine 206, those skilled in the art will recognize that the functionality of filter 212 can be incorporated into search engine 206.

Figure 4:
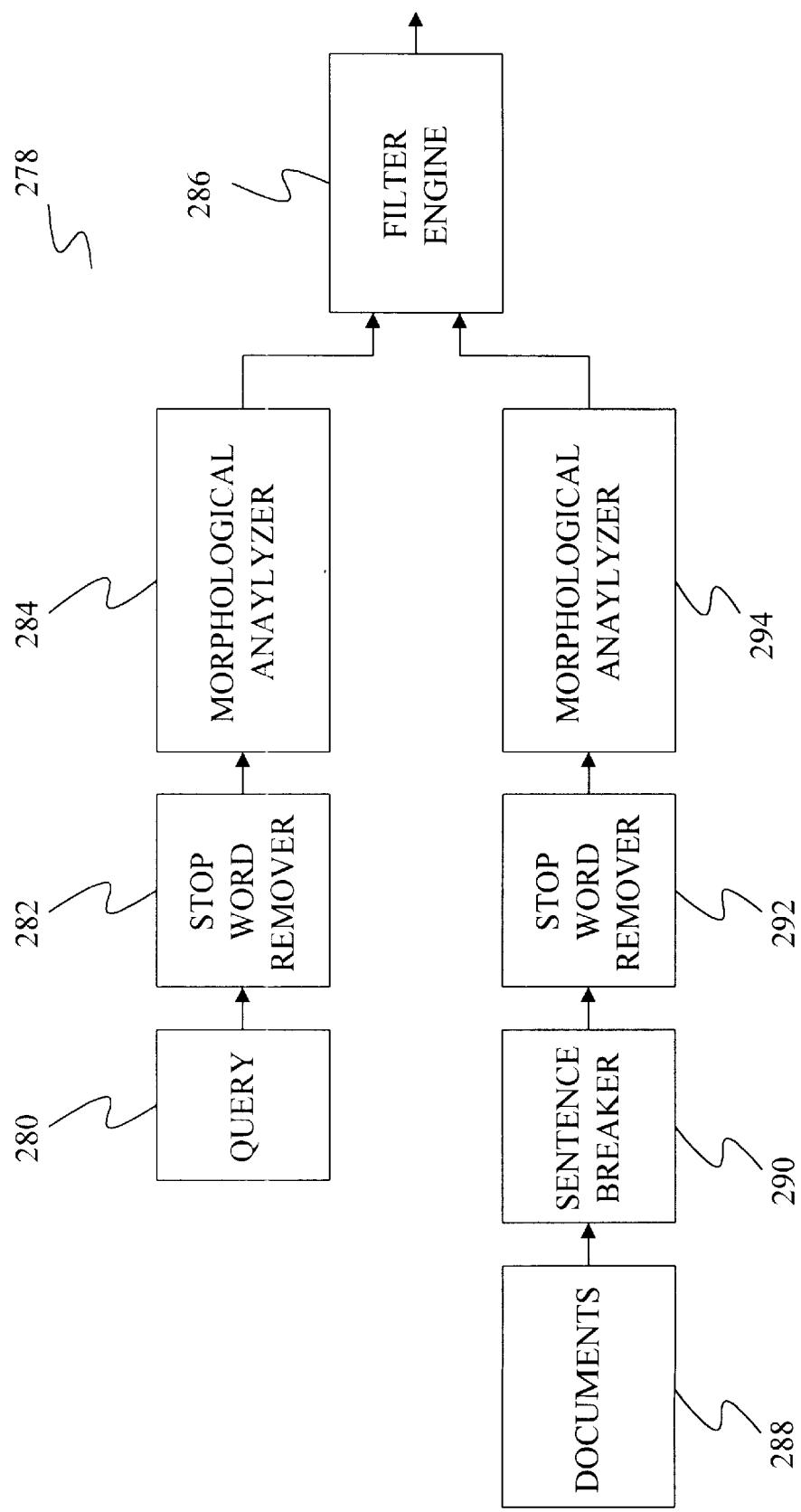
FIG. 4 is a block diagram of one embodiment of the search filter of FIG. 2.

FIG. 4 provides a block diagram of a search filter 278, which is one embodiment of search filter 212 of FIG. 2. The components of search filter 278 are described below in connection with the flow diagram of FIG. 5, which describes the operation of the search filter.

Figure 5:
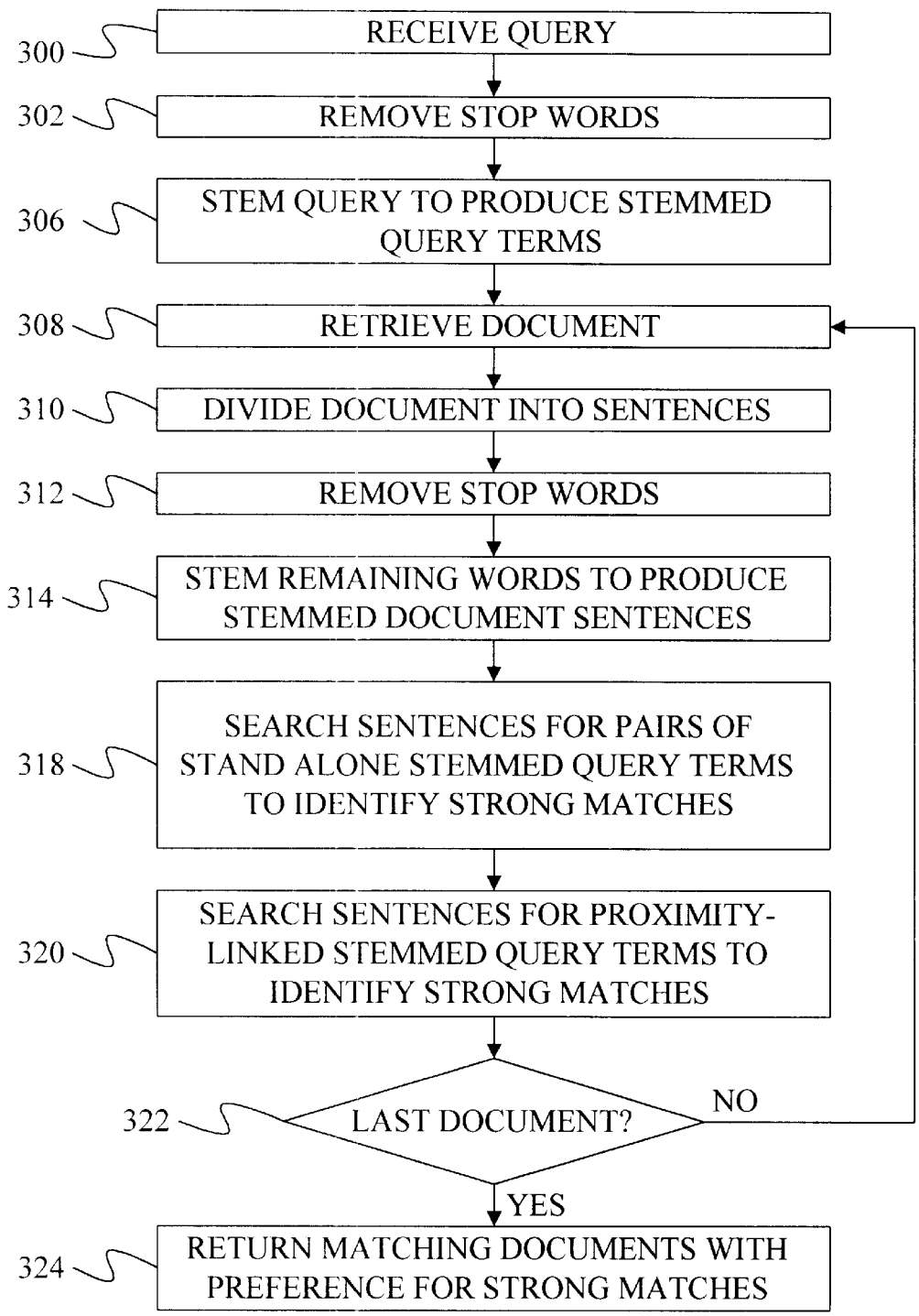
FIG. 5 is a flow diagram of a method of the present invention associated with the search filter of FIG. 4.

At step 300 of FIG. 5, a search query 280 is received by search filter 278 of FIG. 4. At step 302, the query is provided to a stop-word remover 282, which removes stop words from the query at step 302. Stop words include terms that are so common in the language that searching for them is meaningless. These include common verbs such as "be" and "have" and prepositions such as "to" and "from."

After the stop words are removed at step 302, the search query is provided to a morphological analyzer 284, which stems the terms of the search query to produce stemmed query terms at step 306. Stemming the search query terms involves identifying the base form of each query term. For example, for the term "shopping" the base form is "shop". In some embodiments of the invention, step 306 only involves the formation of the base forms. In other embodiments, step 306 also includes the production of variations of the search term based on the base form. For example, the variations of the base form "shop" are "shops", "shopper", "shopped" and "shopping".

The stemming can be done on a simple basis by forming every base form of each search term. For example, the term "does" has two base forms "do" and "doe", depending on its part of speech. Under the simple technique, both base forms are created. In other embodiments, stemming is performed on the basis of the term's part of speech in the search query. Thus, in the example above, either "do" or "doe" would be generated depending on "does" part of speech in the search query.

After the query has been stemmed at step 306 and in some embodiments after the variations of each base form have been determined, search filter 278 retrieves documents 288 of FIG. 4 in step 308 of FIG. 5. Documents 288 are referred to in FIG. 2 as the preliminary results provided to the search filter by search engine 206. Documents 288 are provided to a sentence breaker 290 of FIG. 4, which divides the documents into individual sentences at a step 310. The sentences of each document are then provided to a stop word remover 292, which removes stop words from the sentences at step 312. The remaining words in the sentences are then stemmed at step 314 of FIG. 5 by a morphological analyzer 294 of FIG. 4. In a simple embodiment, the remaining words in the documents are simply stemmed to create document base forms that are compared to the base forms in the search query as described below. In more elaborate embodiments, variations of the document base forms are created and used in the matching algorithm described below.

At step 318, filter engine 286 examines the search query to locate stand-alone terms in the query. A stand-alone term is one that appears in the search query without any logical operators connecting it to any other terms. If filter engine 286 determines that there are multiple stand-alone terms in the search query, it forms every possible pair combination of those terms. Thus, if there are three stand-alone search terms A, B, and C in the search query, filter engine 286 forms pair combinations AB, BC, and AC. In other embodiments, filter engine 286 forms pair combinations of the stemmed forms of the stand-alone search terms.

In the embodiment of FIG. 4, filter engine 286 also forms the pair combinations associated with the variations of the stemmed forms of the search terms. Thus, if there are two stand-alone terms A and B that have variations a1, a2, a3 and b1, b2, b3, respectively, filter engine 286 forms pair combinations a1b1, a1b2, a1b3, a2b1, a2b2, a2b3, a3b1, a3b2, and a3b3.

Filter engine 286 examines each sentence of each document to determine if the sentence includes both terms of any of the pair combinations constructed above. If a sentence includes a pair of such stand-alone terms, the document associated with the sentence is identified as a strong match.

At step 320, filter engine 286 searches the sentences for pairs of proximity-linked query terms. A proximity-linked query term is one that is connected to another query term by a pseudo-Boolean proximity logical operator such as NEAR or W/x (within x words). As in step 318, search engine 286 produces every possible pair combination for terms connected by a proximity logical operator. In addition, in the embodiment of FIG. 4, filter engine 286 produces every possible pair combination that can be produced from the stemmed forms associated with the proximity-linked terms.

Once the combination pairs have been identified, filter engine 286 examines each sentence to determine if it includes both terms of a proximity-linked pair. If a sentence includes both terms of a pair, the sentence's associated document is identified as a strongly matching document.

At step 322, the process determines if this is the last document in the set of documents 288. If this is not the last document, the next document in the set of documents 288 is retrieved by returning to step 308 of FIG. 5. If this is the last document at step 322, filter engine 286 gives preference to strongly matching documents to produce a set of output documents. In FIG. 2, this set of output documents is provided to main search tool 208. The strongly matching documents are those documents that were designated as strongly matching in step 318 or step 320. Giving these documents preference can include returning only these documents and ignoring the remaining documents in the set of documents 288 or organizing the output documents so that strongly matching documents are returned before the remainder of the documents in the set of documents 288.

In the method of FIG. 5, the process of finding strongly matching documents is described using a series of two searches shown as steps 318 and 320. Those skilled in the art will recognize that these steps can be combined as a single pass through the documents such that each sentence of every document is examined to determine if it includes a pair of stand-alone terms or a pair of proximity-linked terms.

In another embodiment of search filter 278, morphological analyzers 284 and 294 are removed from the search filter and step 306 and step 314 are removed from the method of FIG. 5. In such embodiments, only the stand-alone terms and proximity-linked terms found in the search query are used to search the documents and no stemmed forms or variations of the search query are produced. In addition, no stemmed forms or variations of the terms in the documents are produced. Such embodiments are more likely to miss relevant documents, however they are much less complex and less costly than the embodiments shown in FIG. 4.

Figure 6:
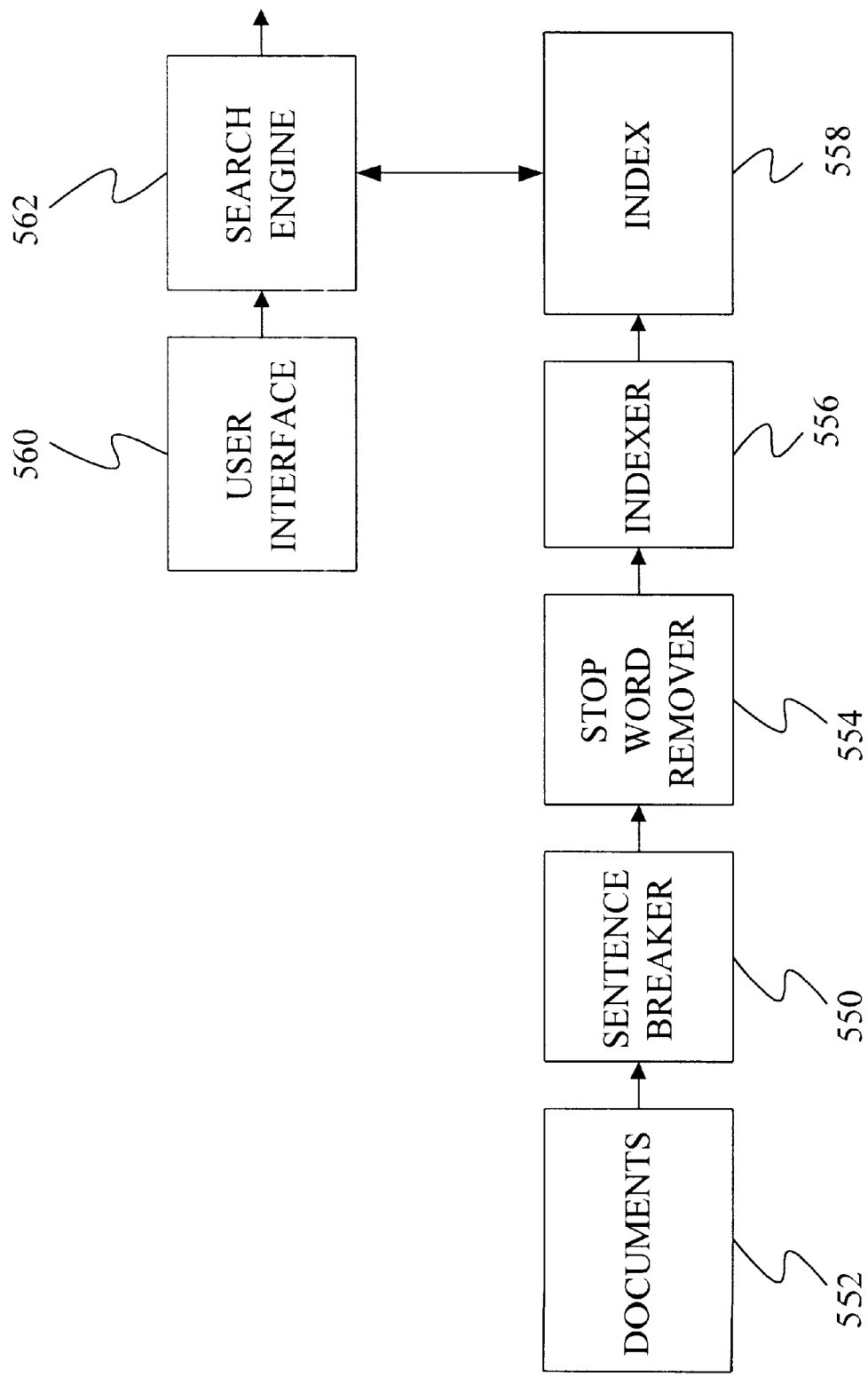
FIG. 6 is a block diagram of an alternative embodiment of the present invention.

FIG. 6 is a block diagram of an alternative embodiment of the present invention that utilizes an index to perform searches. The operation of the embodiment of FIG. 6 is described in a flow diagram in FIG. 7.

Figure 7:
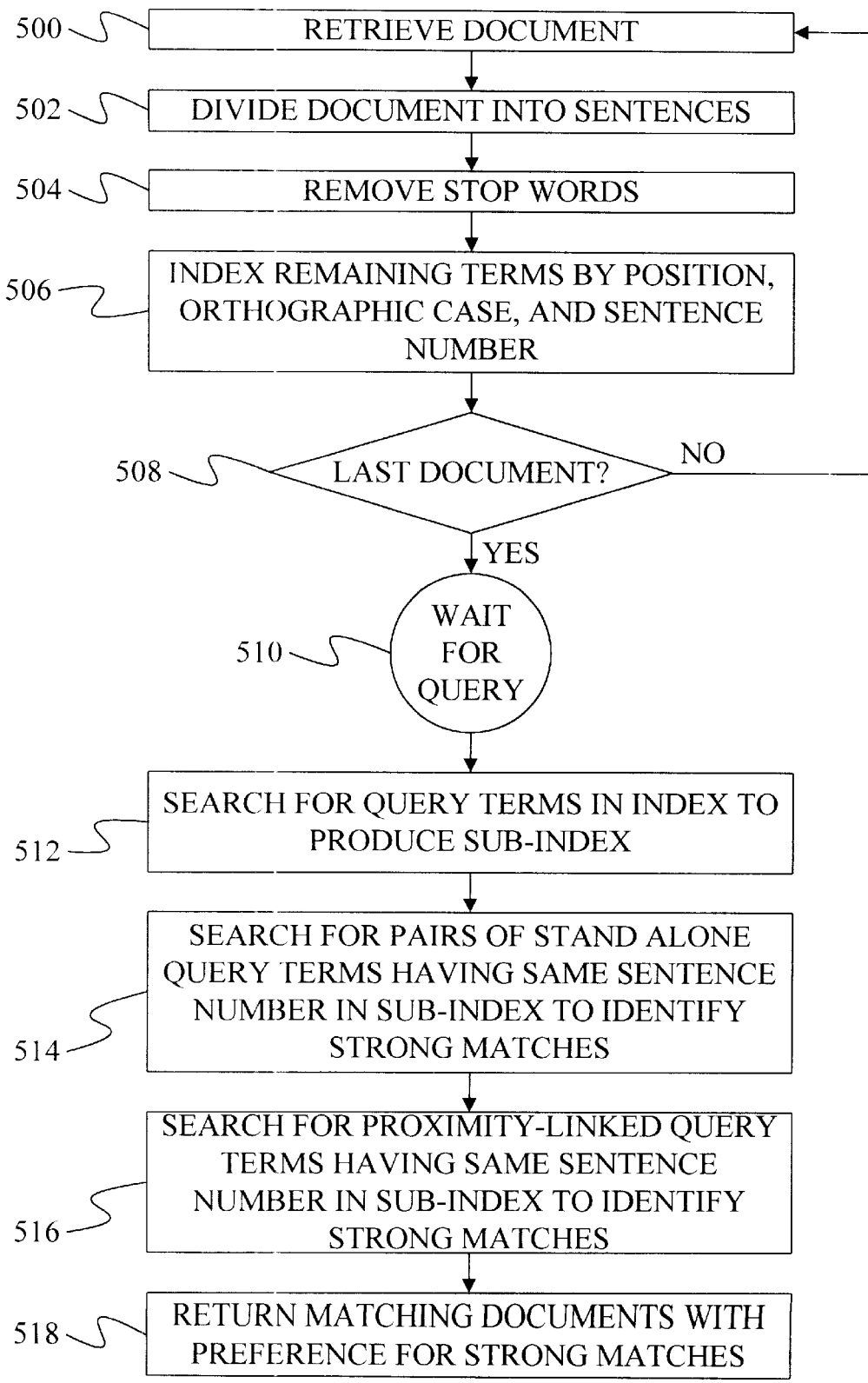
FIG. 7 is a flow diagram of a method of the present invention associated with the block diagram of FIG. 6.

At step 500 of FIG. 7, a sentence breaker 550 of FIG. 8 retrieves a document from a document storage unit 552. At step 502 of FIG. 7, sentence breaker 550 divides the retrieved document into sentences using one or more techniques well known in the art.

At step 504, the sentences are passed through a stop-word remover 554, which removes any stop-words in the sentences. The modified sentences are then passed to an indexer 556, which indexes the terms in the sentence by their position within the sentence, the orthographic case of the terms in the sentence and a sentence number. This is performed as a step 506 of FIG. 7 resulting in an index 558 of FIG. 6.

At step 508 of FIG. 7, the system determines if this is the last document in document storage 552. If this was not the last document at step 508, the process returns to step 500 where the next document in document storage 552 is retrieved.

After the last document in document storage 552 is processed at step 508, the system waits at step 510 for a search query to be received from a user interface 560. When user interface 560 provides a search query to search engine 562 in FIG. 9, the search engine searches index 558 for terms found in the query. Based on this search, search engine 562 generates a sub-index for each term that matches at a step 512.

At step 514, search engine 562 searches the sub-index for pairs of stand-alone query terms that have the same sentence number. If a pair of stand-alone terms is found in a same sentence in the sub-index, the corresponding document is identified as a strongly matching document. At step 516 of FIG. 7, search engine 562 searches through the sub-index for pairs of proximity-linked query terms. In particular, search engine 562 identifies the proximity-linked pairs that have the same sentence number in the sub-index. For each proximity-linked pair in the sub-index, the corresponding documents are identified as strongly matching documents.

At step 518, search engine 562 returns documents that match search query 562 while giving preference to those documents that strongly match the search query. This preference can include eliminating documents that do not strongly match or providing documents that strongly match before documents that do not strongly match.

The system of FIG. 6 can be incorporated into the system of FIG. 2 by replacing the functionality of search engine 206 and search filter 212 with the functionality of search engine 562 of FIG. 6, and replacing database 210 with index 558 of FIG. 6.

Although the present invention has been described with relation to block diagrams, those skilled in the art will recognize that the functionality described for the various blocks can be implemented as computer instructions and that the computer instructions do not necessarily have to be grouped together as shown in the block diagrams of the present application. In addition, although the present invention has been described with reference to particular embodiments, workers skilled in the art will recognize that changes may be made in form and detail without departing from the spirit and scope of the invention.

What is claimed is:

1. A method for processing a search query to locate documents relevant to the search query in a computer environment, the method comprising:

receiving parameters of the search query from a user, the parameters of the search query comprising search terms;

determining all possible pair combinations of at least three search terms;

adding a restriction to the parameters of the search query to require that at least one of the pair combinations appear in a same sentence in a document;

searching through a representation of a set of documents based on the parameters of the search query and the added restriction; and identifying documents that meet the parameters of the search query and the added restriction.

2. The method of claim 1 further comprising stemming at least two of the search terms to produce stemmed terms, determining a pair combination of at least two stemmed terms and wherein adding a restriction to the parameters of the search query comprises requiring that at least one of the possible pair combinations of the stemmed terms appear in a same sentence in a document.

3. The method of claim 2 wherein stemming at least two of the search terms comprises stemming on the basis of the search terms' respective parts of speech.

4. The method of claim 1 wherein searching through a representation of a set of documents comprises searching through an index representing a set of documents.

5. The method of claim 4 wherein the index includes entries for terms in the set of documents, each entry indicating at least one sentence where the term is found in a document.

6. The method of claim 4 wherein the index is created by dividing documents into sentences, identifying each sentence with a sentence marker, and creating an entry for each term in a sentence by associating the term with its corresponding sentence marker.

7. The method of claim 1 wherein searching through a representation of a set of documents comprises:

searching through a set of documents based on the parameters of the search query but not the added restriction to produce preliminary results; and searching through the preliminary results based on the added restriction.

8. The method of claim 1 wherein determining all possible pair combinations of at least three search terms comprises determining a pair combination for at least two stand alone terms.

9. The method of claim 1 wherein determining all possible pair combinations of at least three search terms comprises determining a pair combination for at least two terms that are connected by a proximity logical operator in the search query.

10. A computerized searching unit for locating documents in a computer environment, the searching unit comprising:

a user interface for soliciting a user's search query from a user;

a search filter for identifying all possible pair combinations for at least three search terms and adding a restriction to the user's search query to require that at least one of the pair combinations appear in a same sentence in a document;

a search engine for searching through a representation of a set of documents based on a search query; and a production unit for returning document identifiers to the user for documents that meet the parameters of the user's search query and the added restriction.

11. The searching unit of claim 10 wherein the search filter adds the restriction to the user's search query to produce a modified search query and the search engine searches based on the modified search query.

12. The searching unit of claim 10 wherein the search engine searches based on the user's search query and the search filter adds the restriction to the user's search query by searching through documents identified by the search engine.

13. The searching unit of claim 10 wherein the representation of the set of documents is an index comprising entries for terms in each document, each entry having a sentence marker indicating at least one sentence in a document where the entry's term is found.

14. A method for searching for documents located in a computer system, the method comprising:

receiving a search query from a user;

searching through a representation of a set of documents for documents that meet the restriction of the search query;

identifying all stand alone terms in a search query;

identifying all possible pair combinations for a set of at least three terms that are based on the stand alone terms;

searching for each pair combination by using a same-sentence restriction that requires the terms in each pair combination to appear in a same sentence; and identifying documents that meet the same-sentence restriction as documents that are to be given preference.

15. The method of claim 14 wherein giving preference to documents comprises identifying only those documents that have at least two terms that are based on terms in the search query in a same sentence even if other documents meet the restrictions of the search query.

16. The method of claim 14 wherein giving preference to documents comprises identifying those documents that have at least two terms that are based on terms in the search query in a same sentence before identifying other documents that meet the restrictions of the search query.

17. The method of claim 14 wherein identifying all possible pair combinations comprises:

stemming all stand alone terms to form stemmed terms; and identifying stemmed pair combinations for the stemmed terms.

18. The method of claim 17 wherein stemming the stand alone terms comprises stemming the stand alone terms based on their respective parts of speech in the search query.

19. The method of claim 14 wherein identifying all pair combinations comprises:

stemming all stand alone terms to form stemmed terms;

creating all variations of the stemmed terms; and identifying pair combinations for the variations of the stemmed terms.

20. A method for searching for documents located in a computer system, the method comprising:

stemming terms in a search query to form stemmed terms;

identifying stemmed pair combinations for the stemmed terms;

searching for each stemmed pair combination by using a same-sentence restriction that requires the two stemmed terms in each stemmed pair combination to appear in a same sentence; and identifying documents that meet the same-sentence restriction as documents that are to be given preference.

21. The method of claim 20 wherein stemming the terms comprises stemming the terms based on their respective parts of speech in the search query.

22. The method of claim 20 further comprising:

creating variations of the stemmed terms;

identifying pair combinations for the variations of the stemmed terms;

searching for each stemmed pair combination by using a same-sentence restriction that requires the variations of the stemmed terms in each stemmed pair combination to appear in a same sentence; and identifying documents that meet the same-sentence restriction as documents that are to be given preference.

23. The method of claim 20 wherein the stemmed terms are formed from stand alone terms in the search query.

24. The method of claim 20 further comprising identifying terms connected by a proximity logical operator in the search query as proximity terms and wherein stemming terms comprises stemming proximity terms.

* * * * *

UNITED STATES PATENT AND TRADEMARK OFFICE
CERTIFICATE OF CORRECTION

PATENT NO. : 6,363,374 B1
DATED : March 26, 2002
INVENTOR(S) : Corston-Oliver et al.

It is certified that error appears in the above-identified patent and that said Letters Patent is hereby corrected as shown below:

Column 7,
Line 10, after "match" add -- the --.
Line 10, delete "562".

Signed and Sealed this

Twenty-ninth Day of October, 2002

Attest:

Attesting Officer

JAMES E. ROGAN
Director of the United States Patent and Trademark Office